D. H. FRIEND.
MOTOR FRAME.
APPLICATION FILED AUG. 7, 1916.

1,318,744.

Patented Oct. 14, 1919.
2 SHEETS—SHEET 1.

Witness:
Ernest C Barker

Inventor
David H Friend
Harry Trease
By Attorneys

D. H. FRIEND.
MOTOR FRAME.
APPLICATION FILED AUG. 7, 1916.

1,318,744.

Patented Oct. 14, 1919.
2 SHEETS—SHEET 2.

Witness
Ernest H. Crocker

Inventor
David H. Friend
By Harry Trease
Attorney

UNITED STATES PATENT OFFICE.

DAVID H. FRIEND, OF NORTH INDUSTRY, OHIO.

MOTOR-FRAME.

1,318,744.

Specification of Letters Patent.  Patented Oct. 14, 1919.

Application filed August 7, 1916. Serial No. 113,469.

*To all whom it may concern:*

Be it known that I, DAVID H. FRIEND, a citizen of the United States, residing at North Industry, in the county of Stark and State of Ohio, have invented certain new and useful Improvements in Motor-Frames, of which the following is a specification.

The invention relates to a frame for electric motors, and the object of the improvement is to provide a frame on the base plate of the motor case upon which all the parts of the motor can be independently mounted and secured before the cover of the case is placed over the same; which is specially desirable in small size motors.

This object of the invention, and ancillary advantages of construction and arrangement, are attained by locating the commutator at the end of the armature which is adjacent to the base plate; by forming or securing a supporting wall upon the base plate around the main bearing of the armature shaft by forming or securing tubular supports for the brush holders upon said supporting wall; and also by forming or securing supporting posts upon the base plate for carrying the field core of the motor.

A preferred embodiment of the invention is illustrated as applied to a motor for a vacuum cleaner fan, in the accompanying drawings, forming part hereof, in which—

Figure 1:
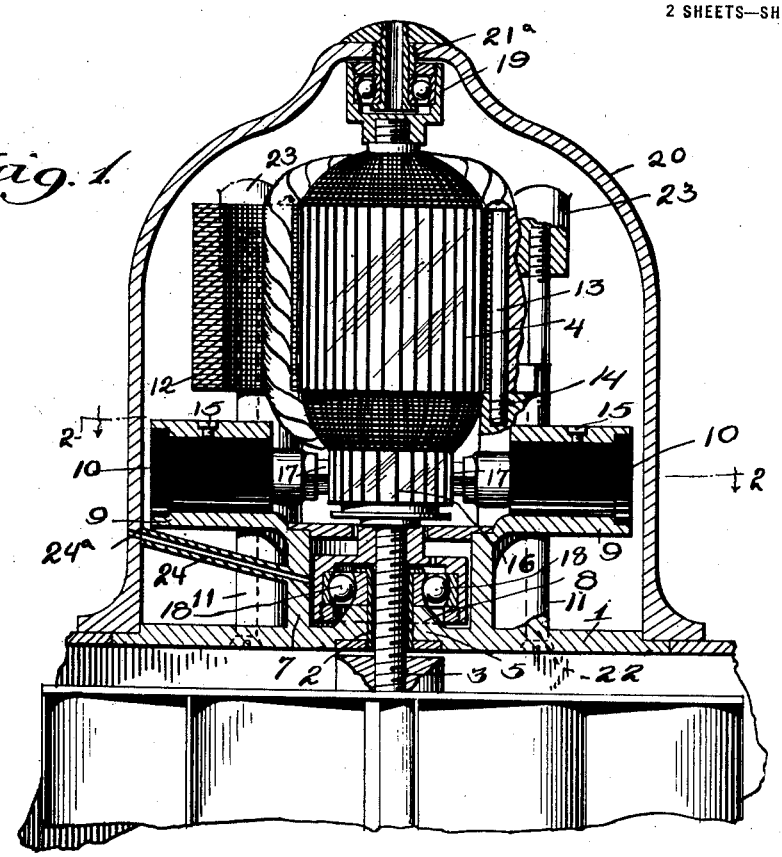
Figure 2:
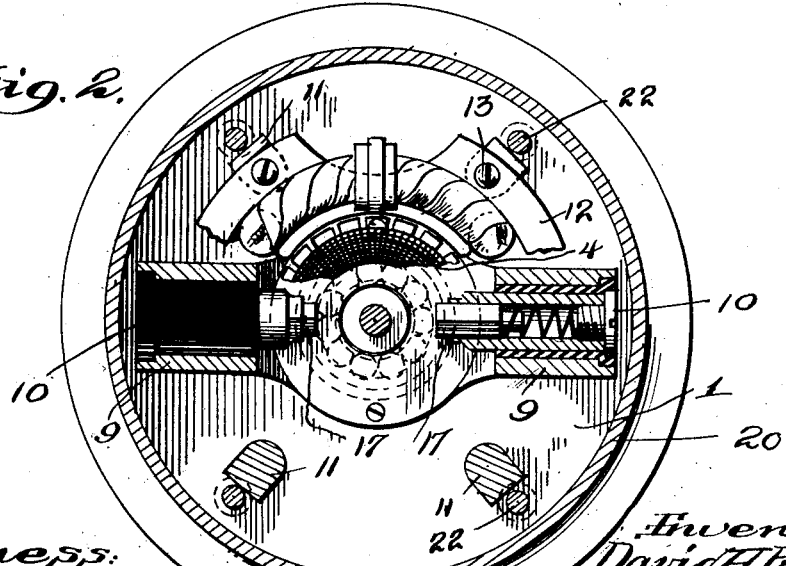
Figures 3, 4:
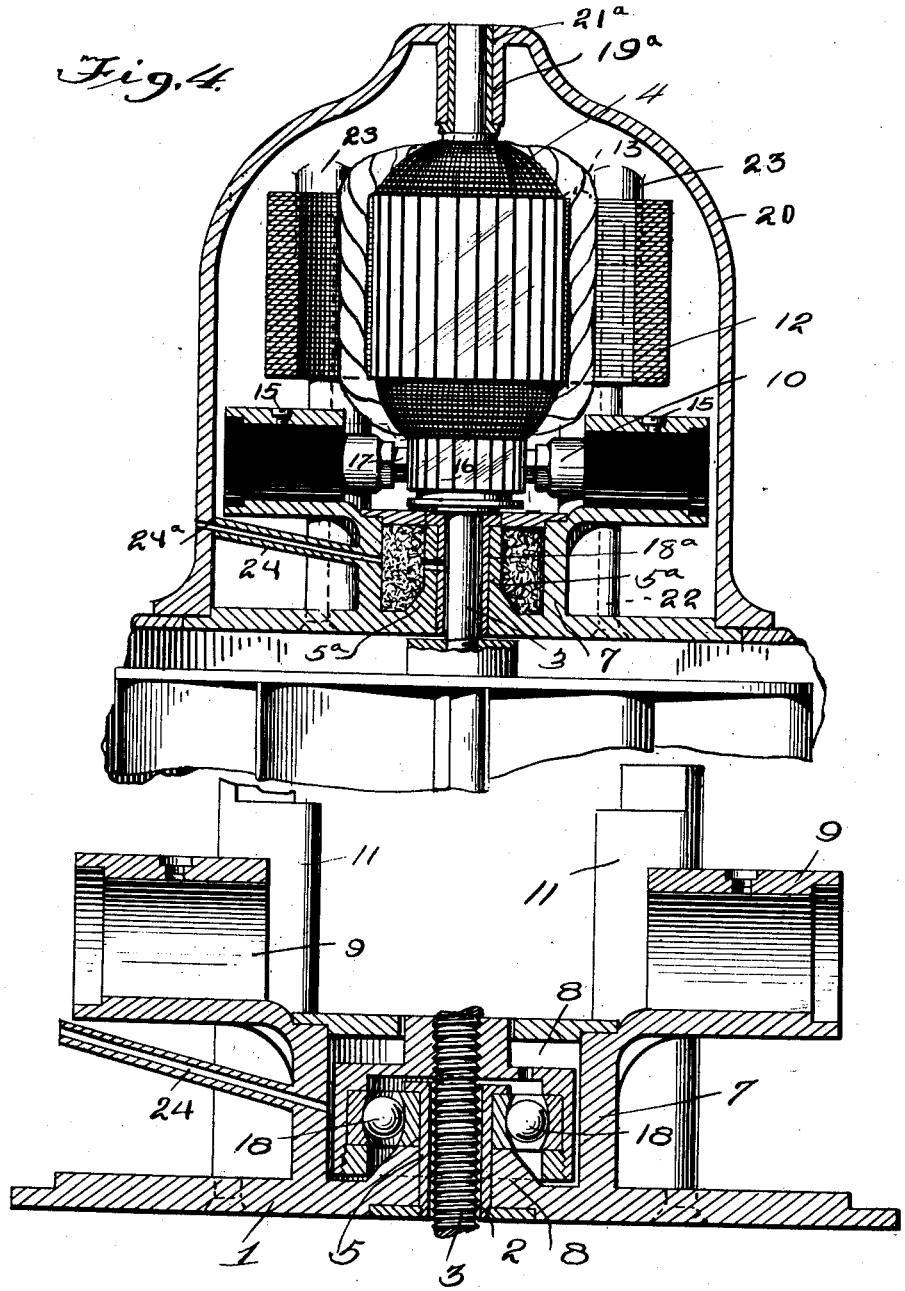

Figure 1 is a vertical section of the motor;

Fig. 2, a plan section of the same as on line 2—2, Fig. 1;

Fig. 3, a detached enlarged sectional view of the motor frame arranged for a ball bearing; and Fig. 4, a vertical section of a motor showing the use of ordinary journal bearings.

Similar numerals refer to similar parts throughout the drawings.

The motor frame includes a base plate 1 having an axial aperture 2 therein for the shaft 3 of the armature 4, a tubular bearing post 5 or $5^a$ on the base plate around the aperture 2, a cylindric supporting wall 7 forming a bearing chamber 8 around the bearing post, tubular supports 9 for the brush holders 10 extending radially from the bearing wall, and supporting posts 11 extending upward from the base plate for the field core 12 of the motor; the base plate being located or arranged transverse or perpendicular to the axis of the shaft.

Upon the frame thus described, which may be formed in an integral structure, the motor parts may be mounted and secured, as by securing the field core 12 on the top of the posts 11 by means of the screws 13 entering the apertures 14 in the tops of the posts, by securing the brush holders 10 in the tubular supports 9 by means of the set screws 15, and by mounting the armature 4 and the commutator 16 on the shaft 3 and inserting the armature, commutator end first, through the upper end of the field, thus bringing the commutator between the brushes 17, and the shaft 3 in the main bearing, which may be either in the form of the ball bearing 18 shown in Figs. 1, 2 and 3, or the ordinary journal bearing $18^a$ shown in Fig. 4.

A suitable bearing 19 or $19^a$ is provided at the upper end of the shaft, and after the parts are thus assembled and secured together, the bell shaped cover 20 may be placed over the complete motor thus formed, said cover having a central aperture 21 or $21^a$ for receiving the upper bearing; and the cover section of the case may be secured to the base plate 1 thereof by means of the bolts 22 extending upward from the base plate and screwed into the pendent bosses 23 formed in the cover section. The radially extending tubular duct 24 may be formed on the supporting wall 7, and a corresponding port $24^a$ may be provided in the cover section of the case for supplying oil into the main bearing chamber.

By this construction and arrangement, it is evident that all the parts of the complete motor can be independently mounted and secured upon the described frame, and that thereafter the cover section of the case may be placed thereover or removed therefrom without disturbing any part of the motor *per se;* and that each of the several parts of the motor can be detached for repair or replacement without disturbing any other motor part.

I claim:—

1. A motor frame comprising a lower supporting base having a bearing, an armature supported on the bearing and provided with a commutator adjacent to the supporting base, said base having means for the support of a field element and also having brush supports independent of the field supporting means.

2. A motor frame comprising a horizontal base plate, a field core thereon, a supporting wall around the perpendicular axis of the plate, radial brush supports on the wall, and post supports for the field core extending upward from the base plate.

3. A motor including a shaft, an armature on the shaft, a base plate perpendicular to the shaft, a field core and brush holders mounted on the base plate independent of each other, a bearing on the plate for one end of the shaft, and a cover on the base plate freely inclosing all the motor parts and having a bearing for the other end of the shaft.

4. A motor including a base plate having a central aperture and a supporting wall around the aperture, a main bearing within the wall, radial supports on the wall, post supports on the base plate, brushes secured in the radial supports, a field core secured on the posts, a shaft extending through the bearing, and an armature within the field core and a commutator between the brushes on the shaft.

DAVID H. FRIEND.